United States Patent
Ghosh et al.

(10) Patent No.: US 10,241,777 B2
(45) Date of Patent: Mar. 26, 2019

(54) METHOD AND SYSTEM FOR MANAGING DELIVERY OF ANALYTICS ASSETS TO USERS OF ORGANIZATIONS USING OPERATING SYSTEM CONTAINERS

(71) Applicant: Conduent Business Services, LLC, Dallas, TX (US)

(72) Inventors: Rahul Ghosh, Bangalore (IN); Varun Sharma, Kolkata (IN); Ajith Ramanath, Bangalore (IN); Atul Singh, Bangalore (IN); Koustuv Dasgupta, Bangalore (IN)

(73) Assignee: CONDUENT BUSINESS SERVICES, LLC, Dallas, TX (US)

( * ) Notice: Subject to any disclaimer, the term of this patent is extended or adjusted under 35 U.S.C. 154(b) by 116 days.

(21) Appl. No.: 15/237,996

(22) Filed: Aug. 16, 2016

(65) Prior Publication Data
US 2018/0052675 A1 Feb. 22, 2018

(51) Int. Cl.
*G06F 9/44* (2018.01)
*G06F 8/65* (2018.01)
*G06F 11/36* (2006.01)

(52) U.S. Cl.
CPC ............ *G06F 8/65* (2013.01); *G06F 11/3604* (2013.01)

(58) Field of Classification Search
CPC ............................... G06F 8/65; G06F 11/3604
USPC ......................................................... 717/131
See application file for complete search history.

(56) References Cited

U.S. PATENT DOCUMENTS

| | | | |
|---|---|---|---|
| 9,077,728 B1* | 7/2015 | Hart | H04L 63/104 |
| 2012/0143951 A1 | 6/2012 | Hacigumus et al. | |
| 2013/0013677 A1 | 1/2013 | Engstrom et al. | |
| 2014/0053150 A1* | 2/2014 | Barnett | G06F 9/455 |
| | | | 718/1 |
| 2014/0156519 A1 | 6/2014 | Thompson | |
| 2014/0196035 A1* | 7/2014 | Ishikawa | G06F 9/45558 |
| | | | 718/1 |
| 2014/0229939 A1 | 8/2014 | Dias de Assuncao et al. | |
| 2015/0301698 A1* | 10/2015 | Roques | G06F 3/0482 |
| | | | 715/736 |

OTHER PUBLICATIONS

D. P. Botero, "Pwnetizer: Improving Availability in Cloud Computing Through Fast Cloning and I/O Randomization", Masters Thesis Talk, Princeton University, 2013.
(Continued)

*Primary Examiner* — Anna C Deng
(74) *Attorney, Agent, or Firm* — Jones Robb, PLLC

(57) ABSTRACT

A method and a system are provided to manage analytics assets associated with at least one computer accessible to an organization using operating system (OS) containers. The method comprising receiving a request to process of a task on the user computing device. The method further select a set of analytics assets from a first category, based on at least one of a role of the user in the organization and a historical usage of the one or more analytics assets or a second category that corresponds to the user and are included in the container image associated with the user. The method further update the container image of the user, based on at least the selection of the set of analytics assets from the first category. The method further render the selected set of analytics assets through the updated container image on the user computing device of the user.

19 Claims, 6 Drawing Sheets

(56) References Cited

OTHER PUBLICATIONS

Hewlett-Packard Technical White Paper, "Reduce Resource and Storage Bandwidth Consumption—Simply and Significantly", Aug. 2012.

* cited by examiner

METHOD AND SYSTEM FOR MANAGING DELIVERY OF ANALYTICS ASSETS TO USERS OF ORGANIZATIONS USING OPERATING SYSTEM CONTAINERS

TECHNICAL FIELD

The presently disclosed embodiments are related, in general, to operating system (OS) containers (e.g., Docker). More particularly, the presently disclosed embodiments are related to the method and system for managing delivery of analytics assets to a user of an organization, using the OS containers.

BACKGROUND

In recent years, with advancements in the field of virtualization, virtually stored software is being increasingly implemented to carry out various tasks on a computing device. This trend is in response to the increasing number of global organizations and high demand for resources that is compelling resource planners to implement various strategies to effectively manage their organization's resources.

Further, to remain competitive in the market, organizations are increasingly seeking on-demand real-time insights (to provide analytics). Although virtual machine technology provides near real-time insights, these insights may result in various losses in organizational decisions. Further, isolation of different users within an organization remains an issue.

In certain scenarios, unauthorized use of non-isolated resources for application delivery may result in misuse of assets, or other costs and inefficiencies. The misuse of assets may also result in violation of organizational policies. Thus, it would be desirable for a system in the organization to incorporate a user-based, isolated asset delivery platform, based on the usage pattern of the authorized user. It would also be desirable to provide the isolated asset delivery platform to multiple users having an interest in the asset ready access in a real-time scenario and historical usage based distribution of the assets in the resource pool for cost optimization. Thus, there is a need for a method and system to provide real-time asset management and a delivery platform, so that the use of resources in the global pool can be optimized and customized on demand and user-based analytics applications can be delivered to the user in real-time.

Further limitations and disadvantages of conventional and traditional approaches will become apparent to a person having ordinary skill in the art, through a comparison of described systems with some aspects of the present disclosure, as set forth in the remainder of the present application and with reference to the drawings.

SUMMARY

According to embodiments illustrated herein, there may be provided a method to manage analytics assets associated with at least one computer accessible to an organization. The method may comprise receiving, by one or more transceivers, a request from a user-computing device. The received request corresponds to processing of a task on the user computing device. The method may further comprise selecting, by one or more processors, a set of analytics assets from a first category based on the received request. The one or more analytics assets, extracted from a database server, are categorized into the first category and a second category based on at least one of a role of the user in the organization and a historical usage of the one or more analytics assets by the user. Further, the one or more analytics assets that correspond to the second category are included in an operating system (OS) container image associated with the user. The method may further comprise updating, by one or more processors, the OS container image associated with the user based on at least the selection of the set of analytics assets from the first category. The method may further comprise rendering, by one or more processors, the selected set of analytics assets through the updated OS container image on the user computing device of the user.

According to embodiments illustrated herein, there may be provided a system to manage analytics assets associated with at least one computer accessible to an organization. The system comprises one or more transceiver that are configured to receive a request from a user-computing device. The received request corresponds to processing of a task on the user computing device. The system may further comprise one or more processors that are configured to select a set of analytics assets from a first category based on the received request. The one or more analytics assets, extracted from a database server, are categorized into the first category and a second category based on at least one of a role of the user in the organization and a historical usage of the one or more analytics assets by the user. Further, the one or more analytics assets that correspond to the second category are included in an operating system (OS) container image associated with the user. The one or more processors may further be configured to update the OS container image associated with the user based on at least the selection of said set of analytics assets from said first category. The one or more processors may further be configured to render the selected set of analytics assets through the updated OS container image on the user computing device of the user.

According to embodiments illustrated herein, there is provided a computer program product for use with a computing device. The computer program product comprises a non-transitory computer readable medium storing a computer program code for managing analytics assets associated with at least one computer accessible to an organization. The computer program code is executable by one or more processors to receive a request from a user computing device associated with a user. The received request corresponds to processing of a task on the user computing device. The computer program code is further executable by the one or more processors to select a set of analytics assets from a first category based on the received request. The one or more analytics assets, extracted from a database server, are categorized into the first category and a second category based on at least one of a role of the user in the organization and a historical usage of the one or more analytics assets by the user. Further, the one or more analytics assets that correspond to the second category are included in an operating system (OS) container image associated with the user. The computer program code is further executable by the one or more processors to update the OS container image of the user based on at least said selection of the set of analytics assets from the first category. The computer program code is further executable by the one or more processors to render the selected set of analytics assets through the updated OS container image on the user computing device of the user.

BRIEF DESCRIPTION OF DRAWINGS

The accompanying drawings illustrate the various embodiments of systems, methods, and other aspects of the disclosure. A person having ordinary skill in the art will appreciate that the illustrated element boundaries (e.g., boxes, groups of boxes, or other shapes) in the figures represent one example of the boundaries. In some examples, one element may be designed as multiple elements, or multiple elements may be designed as one element. In some examples, an element shown as an internal component of one element may be implemented as an external component in another, and vice versa. Further, the elements may not be drawn to scale.

Various embodiments will hereinafter be described in accordance with the appended drawings, which are provided to illustrate and not limit the scope in any manner, wherein similar designations denote similar elements, and in which.

DETAILED DESCRIPTION

Figure 1:
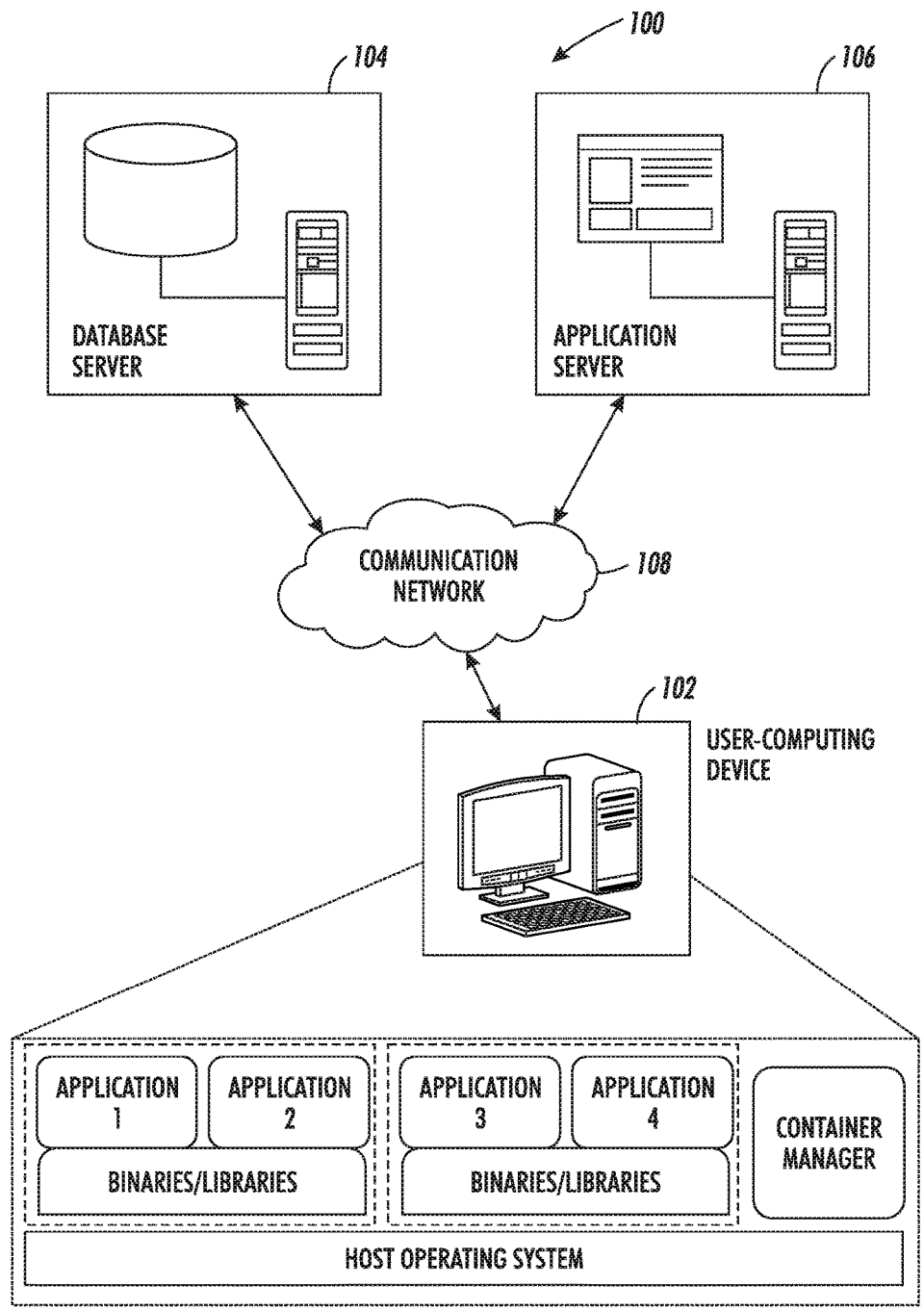
FIG. 1 is a block diagram that illustrates a system environment in which various embodiments of a method and a system may be implemented.

The present disclosure may be best understood with reference to the detailed figures and description set forth herein. Various embodiments are discussed below with reference to the figures. However, those skilled in the art will readily appreciate that the detailed descriptions given herein with respect to the figures are simply for explanatory purposes, as the methods and systems may extend beyond the described embodiments. For example, the teachings presented and the needs of a particular application may yield multiple alternative and suitable approaches to implement the functionality of any detail described herein. Therefore, any approach may extend beyond the particular implementation choices in the following embodiments described and shown.

References to "one embodiment," "at least one embodiment," "an embodiment," "one example," "an example," "for example," and so on indicate that the embodiment(s) or example(s) may include a particular feature, structure, characteristic, property, element, or limitation but that not every embodiment or example necessarily includes that particular feature, structure, characteristic, property, element, or limitation. Further, repeated use of the phrase "in an embodiment" does not necessarily refer to the same embodiment.

Definitions

The following terms shall have, for the purposes of this application, the respective meanings set forth below.

An "analytics asset" refers to a tool, a statistical package, and a library that may be required to show data insights on a dashboard. Based on a type of visualization seen by a user on the dashboard, one or more analytics assets may be used to build descriptive, prescriptive, and predictive analytics from one or more data sources. Examples of the one or more analytics assets include, but are not limited to, statistical packages (e.g., R), licensed or open-source data mining packages (e.g., SAS Enterprise Miner, Weka), search tools (e.g., Lucene), process mining tools (e.g., ProM) and/or the like. Further, in an embodiment, the analytics asset may cater to the needs of a user in an organization.

An "application" refers to a software, a task, or a workload that a user may want to execute on a computing device. The applications may vary in their resource requirements. For example, some applications may be memory-intensive (may require large memory space to be executed), while other applications may be CPU-intensive. In an embodiment, a type of the application may correspond to one or more of, but not limited to, a web based application, a gaming application, an analytical application, a mobile application, and/or the like.

An "operating system" refers to a collection of one or more software modules that are installed on a computing device and thereafter, are operable to manage one or more applications on the computing device or one or more other computing devices to process one or more requests of a task on the computing device or the one or more other computing devices. For example, operating systems including, but not limited to, "UNIX," "DOS," "Android," "Symbian," and "Linux."

An "operating system (OS) container" refers to a virtual environment that groups and isolates a set of processes and resources, such as central processing unit (CPU) memory, disk, and/or the like, from a host and/or other OS container. Such isolation ensures that the processes inside the OS container cannot see the processes outside the OS container. More specifically, the OS container is the virtual environment that shares the kernel of a host operating system but facilitates user space isolation.

A "container image" refers to a read-only template from which one or more OS containers are initiated. Further, an image can be an OS instance with one or more applications installed. In an embodiment, the container image can be updated when an analytics asset is moved from one asset category to other category, which is based on a usage of the analytics asset.

A "container instance" refers to an execution environment created from a container image. In an embodiment, the container image is updated when an analytics asset is transferred from a local category to a global category, or vice versa. Based on such transfer of the analytics asset, the container image gets updated. When a container is instantiated from the updated image, the running container instance also contains all the updates.

A "first category" refers to a category that includes one or more analytics assets (e.g., one or more packages, software, libraries, and/or the like) that are shared with one or more users across one or more roles in an organization. In an embodiment, the one or more analytics assets are kept under a global analytics pool (i.e., a common shared storage unit) for easy access by the one or more users.

A "second category" refers to a category that includes one or more analytics assets (e.g., one or more packages, software, libraries, and/or the like) that are used by a specific user of an organization. In an embodiment, the one or more analytics assets that correspond to the second category are shared with a user associated with a specific role in an organization and are kept under a local analytics pool of the corresponding user.

A "user" refers to an individual who is responsible for performing one or more tasks based on one or more associated roles of the individual in an organization. Further, in an embodiment, each user may be associated with an OS container instance based on the one or more associated roles that include one or more analytics assets. The user may utilize the one or more analytics assets to process the one or more tasks.

A "role" refers to a designation in an organization associated with a set of responsibilities that a user may have to perform. For example, a role may correspond to at least one of, but is not limited to, a senior vice president (SVP), a vice president (VP), a business manager (BM), an operations manager (OM), a team Lead (TL), and/or the like.

A "decision engine" refers to a computing device that intercepts one or more requests received from a user computing device. In an embodiment, the decision engine may further be operable to decide whether one or more analytics assets, associated with the one or more requests, are required to be used from a local analytics assets or a global analytics assets.

"REST" stands for representational state transfer, which is an architectural style for networked hypermedia applications. It may be utilized to build web services that are lightweight, maintainable, and scalable. A service based on REST may be referred to as a RESTful service. REST may not depend on any protocol, but almost every RESTful service may use HTTP as its protocol.

FIG. 1 is a block diagram that illustrates a system environment 100 in which various embodiments of a method and a system may be implemented. The system environment 100 may include a user-computing device 102, a database server 104, an application server 106, and a communication network 108. The user-computing device 102, the database server 104, and the application server 106 may be communicatively coupled with each other over the communication network 108.

In an embodiment, the user-computing device 102 refers to a computing device that may be used by a user to perform one or more operations in an organization. The user-computing device 102 may comprise one or more processors and one or more memory units. The one or more memory units may include one or more sets of computer readable codes, instructions, programs, or algorithms that may be executable by the one or more processors to perform the one or more operations. For example, a user may utilize the user-computing device 102 to transmit one or more requests to a computing server, such as the database server 104 or the application server 106, over the communication network 108. The one or more requests may correspond to processing of one or more tasks on the user-computing device 102. The one or more requests may further include a requirement of one or more analytics assets that may be utilized by the user to process the one or more tasks on the user-computing device 102. The one or more requests may further include additional information, such as a role of the user in the organization, a purpose of the requirement of the one or more analytics assets, an associated project, time duration for which the one or more analytics assets, and/or the like, are required. The user may further utilize the user-computing device 102 to view and accept or reject the one or more analytics assets recommended by the application server 106. Examples of the user-computing device 102 may include, but are not limited to, a desktop computer, a laptop, a personal digital assistant (PDA), a mobile device, a smartphone, a tablet (e.g., iPad® and Samsung Galaxy Tab®), or any other computing device.

The database server 104 may refer to a computing server or a storage device that may be configured to perform one or more database operations. The one or more database operations may include one or more of, but are not limited to, storing, and processing one or more queries, requests, data, or content. Such one or more queries, requests, data, or content may be received from or transmitted to one or more computing devices. For example, the database server 104 may be configured to store one or more analytics assets. In addition to the one or more analytics assets, the database server 104 may be configured to store one or more requests received from a user-computing device 102.

In an embodiment, the database server 104 may further be configured to store a container instance for each user in the organization based on a role of each user. The container instance may include at least a pool of local analytics assets that may be required by each user to perform the one or more tasks on the user-computing device 102, for example, on a regular basis. The one or more analytics assets in the pool of local analytics assets may be determined based on the role of each user in the organization. The one or more analytics assets may include one of one or more statistical packages, one or more applications and related tools, one or more process mining tools, one or more open-source or licensed data mining packages. In an embodiment, the database server 104 may further be configured to store a pool of global analytics assets that may be required by each user to perform the one or more tasks on the user-computing device 102, for example, on a project demand basis. In an embodiment, the database server 104 may further be configured to store one or more cost topologies. The one or more cost topologies may be representative of one or more cost plans that may be required to capture charges that each user may incur based on an utilization of the one or more analytics assets that correspond to the pool of local analytics assets and/or the pool of global analytics assets. Hereinafter, the pool of global analytics assets has been referred to as a first category and the pool of local analytics assets has been referred to as a second category.

Further, in an embodiment, the database server 104 may store one or more sets of instructions, codes, scripts, or programs that may be retrieved by the application server 106 to perform one or more operations. For querying the database server 104, one or more querying languages may be utilized, such as, but not limited to, SQL, QUEL, and DMX. In an embodiment, the database server 104 may be realized through various technologies, such as, but not limited to, Microsoft® SQL Server, Oracle®, IBM DB2®, Microsoft Access®, PostgreSQL®, MySQL® and SQLite®, and the like.

A person having ordinary skill in the art will understand that the scope of the disclosure is not limited to the database server 104 as a separate entity. In an embodiment, the functionalities of the database server 104 may be integrated into the application server 106, or vice versa, without limiting the scope of the disclosure.

The application server 106 may refer to a computing device or a software framework hosting an application or a software service. In an embodiment, the application server 106 may be implemented to execute procedures, such as, but not limited to, the one or more sets of programs, instructions, codes, routines, or scripts stored in one or more memories for supporting the hosted application or the software service. In an embodiment, the hosted application or the software service may be configured to perform one or more pre-defined operations. Prior to performing the one or more pre-defined operations, the application server 106 may be operable to receive the one or more requests, pertaining to the requirement of the one or more analytics assets, from the user-computing device 102 or the database server 104 over the communication network 108.

After receiving the one or more requests, the application server 106 may be operable to perform the one or more pre-defined operations. For example, the one or more pre-defined operations may include one or more of, but are not limited to, processing the one or more requests to determine whether the required one or more analytics assets corresponds to the first category and/or the second category, and transmitting one or more queries to the database server 104 to extract the required one or more analytics assets based on the determination. Thereafter, the application server 106 may be operable to update the second category in the container instance of the user, when the required one or more analytics assets are extracted from the first category. Thereafter, the application server 106 may be operable to deliver the extracted one or more analytics to the user-computing device 102 over the communication network 108. Further, the application server 106 may be operable to perform a check on the usage of the one or more analytics assets in the second category. In case the application server 106 determines that the utilization of the one or more of the one or more analytics assets in the second category is below a threshold value, the application server 106 may transfer the underutilized one or more analytics assets from the second category to the first category. The management of the one or more analytics assets has been explained in detail in conjunction with FIG. 3.

The application server 106 may be realized through various types of application servers such as, but are not limited to, a Java application server, a .NET framework application server, a Base4 application server, a PHP framework application server, or any other application server framework.

A person having ordinary skill in the art will appreciate that the scope of the disclosure is not limited to realizing the application server 106 and the user-computing device 102 as separate entities. In an embodiment, the application server 106 may be realized as an application program installed on and/or running on the user-computing device 102 without departing from the scope of the disclosure.

In an embodiment, the communication network 108 may correspond to a communication medium through which the user-computing device 102, the database server 104, and the application server 106 may communicate with each other. Such a communication may be performed in accordance with various wired and wireless communication protocols. Examples of such wired and wireless communication protocols include, but are not limited to, Transmission Control Protocol and Internet Protocol (TCP/IP), User Datagram Protocol (UDP), Hypertext Transfer Protocol (HTTP), File Transfer Protocol (FTP), ZigBee, EDGE, infrared (IR), IEEE 802.11, 802.16, 2G, 3G, 4G cellular communication protocols, and/or Bluetooth (BT) communication protocols. The communication network 108 may include, but is not limited to, the Internet, a cloud network, a Wireless Fidelity (Wi-Fi) network, a Wireless Local Area Network (WLAN), a Local Area Network (LAN), a telephone line (POTS), and/or a Metropolitan Area Network (MAN).

Figure 2:
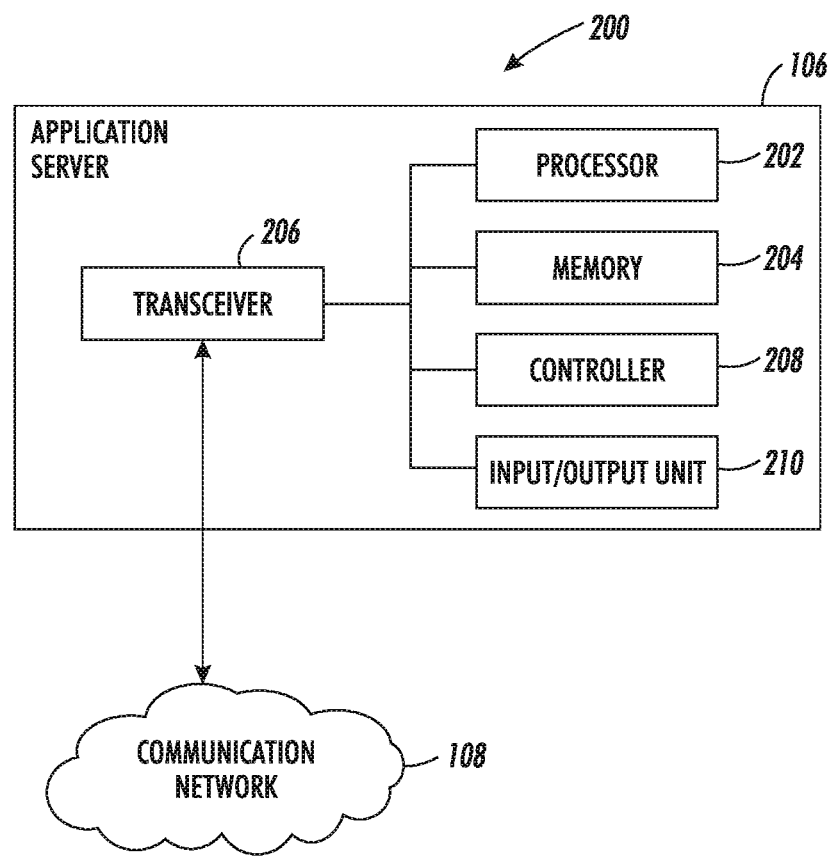
FIG. 2 is a block diagram that illustrates a computing server configured to manage delivery of analytics assets in an organization, in accordance with at least one embodiment.

FIG. 2 is a block diagram that illustrates a computing server configured to manage one or more analytics assets in an organization, in accordance with at least one embodiment. With reference to FIG. 2, the computing server has been referred to as the application server 106 that has been explained in conjunction with the elements from FIG. 1. In an embodiment, the application server 106 may include one or more processors, such as a processor 202, one or more memories, such as a memory 204, one or more transceivers, such as a transceiver 206, one or more controllers, such as a controller 208, and one or more input/output (I/O) units, such as an I/O unit 210.

The processor 202 comprises suitable logic, circuitries, interfaces, and/or codes that may be configured to execute one or more set of instructions, programs, or algorithms stored in the memory 204. The processor 202 may be communicatively coupled to the memory 204, the transceiver 206, the controller 208, and the I/O unit 210. The transceiver 206 may be communicatively coupled to the communication network 108. The processor 202 may be implemented based on a number of processor technologies known in the art. The processor 202 may work in coordination with the transceiver 206, the controller 208, and the I/O unit 210 to manage one or more analytics assets in one or more organizations. Examples of the processor 202 include, but is not limited to, an X86-based processor, a Reduced Instruction Set Computing (RISC) processor, an Application-Specific Integrated Circuit (ASIC) processor, a Complex Instruction Set Computing (CISC) processor, and/or other processor.

The memory 204 comprises suitable logic, circuitries, interfaces, and/or codes that may be configured to store the one or more set of instructions, programs, or algorithms, which are executed by the processor 202 to perform the one or more predetermined operations. In an embodiment, the memory 204 may be configured to store one or more programs, routines, or scripts that may be executed in coordination with the processor 202. The memory 204 may be implemented based on a Random Access Memory (RAM), a Read-Only Memory (ROM), a Hard Disk Drive (HDD), a storage server, and/or a Secure Digital (SD) card. It will be apparent to a person having ordinary skill in the art that the one or more sets of instructions, codes, scripts, and programs stored in the memory 204 may enable the hardware of the system to perform the one or more predetermined operations.

The transceiver 206 comprises suitable logic, circuitries, interfaces, and/or codes that may be configured to receive/transmit the one or more queries, requests, data, content, or other information from/to one or more computing devices (e.g., the database server 104 or the user-computing device 102) over the communication network 108. The transceiver 206 may implement one or more known technologies to support wired or wireless communication with the communication network 108. In an embodiment, the transceiver 206 may include, but is not limited to, an antenna, a radio frequency (RF) transceiver, one or more amplifiers, a tuner, one or more oscillators, a digital signal processor, a Universal Serial Bus (USB) device, a coder-decoder (CODEC) chipset, a subscriber identity module (SIM) card, and/or a local buffer. The transceiver 206 may communicate via wireless communication with networks, such as the Internet, an Intranet and/or a wireless network, such as a cellular telephone network, a wireless local area network (LAN) and/or a metropolitan area network (MAN). The wireless communication may use any of a plurality of communication standards, protocols and technologies, such as: Global System for Mobile Communications (GSM), Enhanced Data GSM Environment (EDGE), wideband code division multiple access (W-CDMA), code division multiple access (CDMA), time division multiple access (TDMA), Bluetooth, Wireless Fidelity (Wi-Fi) (e.g., IEEE 802.11a, IEEE 802.11b, IEEE 802.11g and/or IEEE 802.11n), voice over Internet Protocol (VoIP), Wi-MAX, a protocol for email, instant messaging, and/or Short Message Service (SMS).

The controller 208 comprises suitable logic, circuitries, interfaces, and/or codes that may be configured to manage the one or more analytics assets based on the one or more requests. The controller 208 may be communicatively coupled to the processor 202, the memory 204, the transceiver 206, and the I/O unit 210. The controller 208 may be a plug-in board, a single integrated circuit on the motherboard, or an external device. Examples of the controller may 208 include, but are not limited to, graphics controller, SCSI controller, network interface controller, memory controller, programmable interrupt controller, terminal access controller, and/or the like.

The I/O unit 210 may comprise suitable logic, circuitries, interfaces, and/or codes that may be operable to receive one or more requests or queries from the user-computing device 102. Further, the I/O unit 210 in conjunction with the transceiver 206 may be configured to transmit one or more responses pertaining to the one or more requests or queries to the database server 104 or the user-computing device 102, via the communication network 108. The I/O unit 210 may be operable to communicate with the processor 202, the memory 204, the transceiver 206, or the controller 208. Examples of the input devices may include, but are not limited to, a touch screen, a keyboard, a mouse, a joystick, a microphone, a camera, a motion sensor, a light sensor, and/or a docking station. Examples of the output devices may include, but are not limited to, a speaker system and a display screen.

Figure 3:
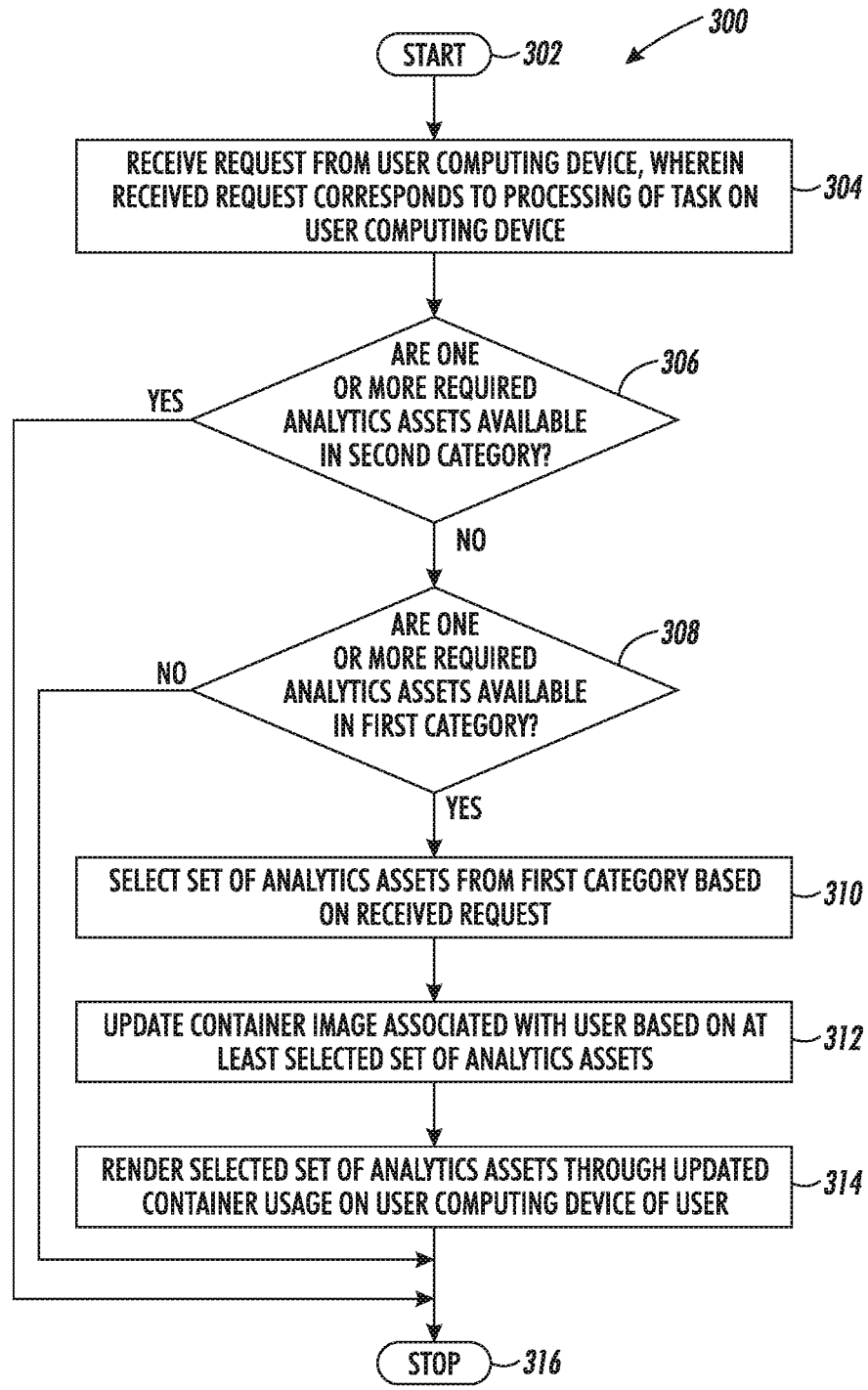
FIG. 3 is a flowchart that illustrates a method to manage analytics assets in an organization, in accordance with at least one embodiment.

FIG. 3 is a flowchart that illustrates a method to manage analytics assets in an organization, in accordance with at least one embodiment. With reference to FIG. 3, there is shown a flowchart 300 that is described in conjunction with FIG. 1 and FIG. 2. The method starts at step 302 and proceeds to step 304.

At step 304, a request is received from the user-computing device 102. In an embodiment, the processor 202 may be configured to receive the request from the user-computing device 102 over the communication network 108. The request may correspond to the processing of a task on the user-computing device 102. In an embodiment, the user may require one or more analytics assets to perform the task on the user-computing device 102. The one or more analytics assets may comprise at least one or more of, but are not limited to, a statistical package (e.g., R), an application and related tools, a process mining tool (e.g., ProM), a search tool (e.g., Lucene), and an open-source or licensed data mining package (e.g., SAS Enterprise Miner, Weka), and one or more associated libraries. In an embodiment, the one or more analytics assets may correspond to a set of analytics assets that is owned by the organization. The one or more analytics assets may further correspond to a set of analytics assets that the organization may provide to one or more users (i.e., one or more employees) through a shared service platform as per requirement to process the task.

Based on the requirements of the one or more analytics assets to perform the task on the user-computing device 102, the user may transmit the request to the database server 104 or the application server 106 over the communication network 108. The request may further include additional information associated with the user and an associated project. For example, the additional information in a request received from a user may include information such as, but not limited to, a role of the user in an organization, a purpose of requirement of one or more analytics assets, an associated project, and/or a time duration for which the one or more analytics assets are required.

Prior to the receiving of the request from the user-computing device 102 over the communication network 108, the processor 202 may be configured to categorize the one or more analytics assets in the first category and the second category. The processor 202 may utilize an image initializer to generate the OS container image, for example LINUX container image, of each user. In an embodiment, the image initializer may be realized using one or more suitable logics, circuitries, interfaces, and/or codes that may be configured to execute one or more set of instructions, programs, or algorithms stored in the memory 204 to perform one or more associated functions. In an embodiment, the image initializer may be operable to generate the OS container image by using a static code analysis technique. The image initializer takes as its input a mapping between a role of the user and restful web services. In an embodiment, the restful web services may be invoked using a web-based dashboard application. For example, a web-based dashboard application utilizes a model-view-controller (MVC) design pattern in which a view is a visual interface presented to a user using a dashboard, a model is data that is used to generate the view in the dashboard, and a controller is an application logic used to generate the view. The web-based dashboard application developed using Java-J2EE technology stack may develop the view using Hyper Text Markup Language (HTML) with embedded java script code to invoke the restful web services that contain the controller code.

Thereafter, the image initializer utilizes a prior knowledge about the one or more analytics assets and one or more method signatures to identify the one or more analytics assets that are associated with the role. The image initializer statically analyzes code for every restful web service and matches function names that are called in the code with the one or more method signatures for the one or more analytics assets to determine the one or more analytics assets associated with the role. The image initializer generates the following output: a) the one or more analytics assets being used by a restful web service, b) the one or more analytics asset to be categorized locally for a role (i.e., the second category), and c) the one or more analytics assets to be categorized globally (i.e., the first category). Based on the aforementioned output, the processor 202 may generate the OS container image of each user. The OS container image may include at least two OS container instances. One of the two OS container instances may comprise the one or more analytics assets that correspond to the first category and the other OS container instance may comprise the one or more analytics assets that correspond to the second category.

After the categorization of the one or more analytics assets into the first category and the second category, the processor 202 may be operable to process the request received from the user-computing device 102. Based on the processing of the received request, the processor 202 may be operable to determine the one or more analytics assets that are required by the user to process the task.

At step 306, a check is performed to determine whether the one or more required analytics assets are available in the second category. In an embodiment, the processor 202 may be operable to perform the check to determine whether the one or more required analytics assets are available in the second category. In an embodiment, if the processor 202 determines that the one or more required analytics assets are available in the second category, then control passes to end step 316. In an embodiment, if the processor 202 determines that the one or more required analytics assets are not available in the second category, then control passes to step 308.

At step 308, a check is performed to determine whether the one or more required analytics assets are available in the first category. In an embodiment, the processor 202 may be operable to perform the check to determine whether the one or more required analytics assets are available in the first category. In an embodiment, if the processor 202 determines that the one or more required analytics assets are not available in the first category, then control passes to end step 316. In an embodiment, if the processor 202 determines that the one or more required analytics assets are available in the first category, then control passes to step 310.

At step 310, a set of analytics assets is selected from the first category based on the received request. The set of analytics assets includes the one or more required analytics assets. In an embodiment, the processor 202 may be configured to select the set of analytics assets from the first category based on the received request. In an embodiment, the first category may comprise the one or more analytics assets that are utilized by one or more other users in the organization. In another embodiment, the first category may comprise the one or more analytics assets that are not being utilized by any of the users in the organization.

After the processor 202 determines that the one or more required analytics assets are available in the first category, the processor 202 may transmit one or more queries to a storage device, such as the database server 104, to select the set of analytics assets from the first category. Thereafter, the processor 202 may store the selected set of analytics assets in the memory 204.

At step 312, the OS container image associated with the user is updated based on at least the selected set of analytics assets. In an embodiment, the processor 202 may be configured to update the OS container image associated with the user based on at least the selected set of analytics assets. In an embodiment, the processor 202 may be operable to update the OS container image based on at least a transfer of the selected set of analytics assets from the first category to the second category.

In an embodiment, the processor 202 may utilize a layered approach to update the OS container image. The OS container image of each user comprises at least two OS container instances, such as a first OS container instance and a second OS container instance. The first OS container instance is made up of a set of layers, such that each layer comprises an analytics asset that corresponds to the first category. Similarly, the second OS container instance is made up of a set of layers, such that each layer comprises an analytics asset that corresponds to the second category. In case of transfer of the selected set of analytics assets from the first category to the second category, the processor 202 may be configured to add or build layers on top of existing layers in the second OS container instance. The count of the added layers may depend on the count of the one or more required analytics assets in the selected set of analytics assets. Thereafter, each of the selected set of analytics assets is transferred to the corresponding added layer in the second OS container instance.

Further, in an embodiment, the processor 202 may be configured to update the OS container image based on at least the usage of the one or more analytics assets that correspond to the first category and/or the second category. The processor 202 may track the usage of the one or more analytics assets that correspond to the first category and/or the second category during a pre-defined time duration. Based on at least the tracked usage, the processor 202 may be configured to update the first category and/or the second category. For example, the processor 202 determines that an employee demands for an analytics asset, such as a search tool (e.g., Lucene) that corresponds to the first category, at least once in every two days. Such demand was tracked for a pre-defined time duration, such as "1 month." In such a case, the processor 202 may be configured to update the second category (i.e., the second OS container instance) by transferring the analytics asset, such as the search tool (e.g., Lucene), from the first category to the second category. In another exemplary scenario, the processor 202 determines that a utilization of an analytics asset, such as a statistical package (e.g., R) that corresponds to the second category, is below a threshold value during a pre-defined time duration, such as "15 days." In such a case, the processor 202 may be configured to update the first category (i.e., the first OS container instance) by transferring the analytics asset, such as the statistical package (e.g., R), from the second category to the first category.

In an embodiment, the updating of the OS container image based on the usage of the one or more analytics assets that corresponds to the first category and/or the second category may enable the organization to optimize the usage of the resources and to increase the performance graph by reducing the unwanted cost associated with the one or more users.

At step 314, the selected set of analytics assets is rendered through the updated OS container image on the user-computing device. In an embodiment, the processor 202 may be configured to render the selected set of analytics assets through the updated container image on the user-computing device 102. In an embodiment, the processor 202 may be configured to render the selected set of analytics assets on a user interface displayed on a display screen of the user-computing device 102 through the updated OS container image. Further, the processor 202 may be configured to install each of the rendered (or selected) set of analytics assets on the user-computing device 102. Further the user may utilize the installed set of analytics assets to perform the task on the user-computing device 102. Control then passes to end step 316.

Figure 4:
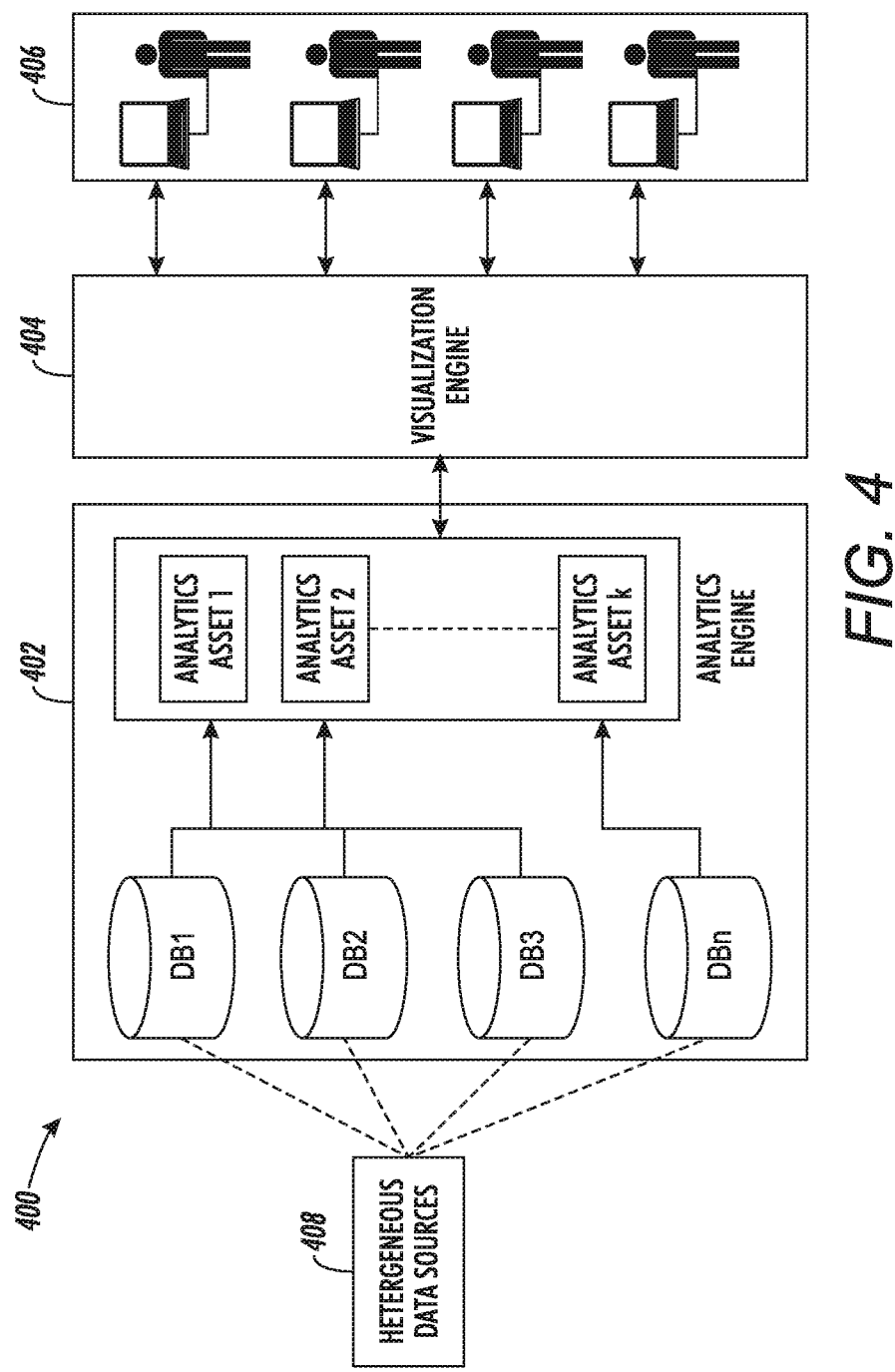
FIG. 4 is a block diagram that illustrates an overview of analytics assets management in an organization, in accordance with at least one embodiment.

FIG. 4 is a block diagram that illustrates an experimental architecture 400 for analytics asset management in an organization. The experimental architecture 400 may include an analytics engine 402, a visualization engine 404, one or more users 406, and one or more heterogeneous data sources 408. The experimental architecture 400 may show one instance, where the one or more users 406, correspond to several leaders within the business organization (e.g., SVP, BM, OM, TL) may be tasked with a continuous monitoring and insight generation from the one or more heterogeneous data sources 408 (e.g., JIRA, GRM, etc.). Further, a user, such as a TL, may be interested in knowing the performance of individual employees, and another user, such as an SVP, may be interested in understanding the overall health of each client. To derive such isolated real-time insights from a common set of data sources and manage the analytics assets in a container, a dynamic update in container image of one or more applications on one or more physical machines by use of OS containers becomes essential. The experimental architecture 400 may further preserve the state of isolation among the installed applications because each role, and individuals within the role, may have different set of requirements in terms of the data.

Figure 5:
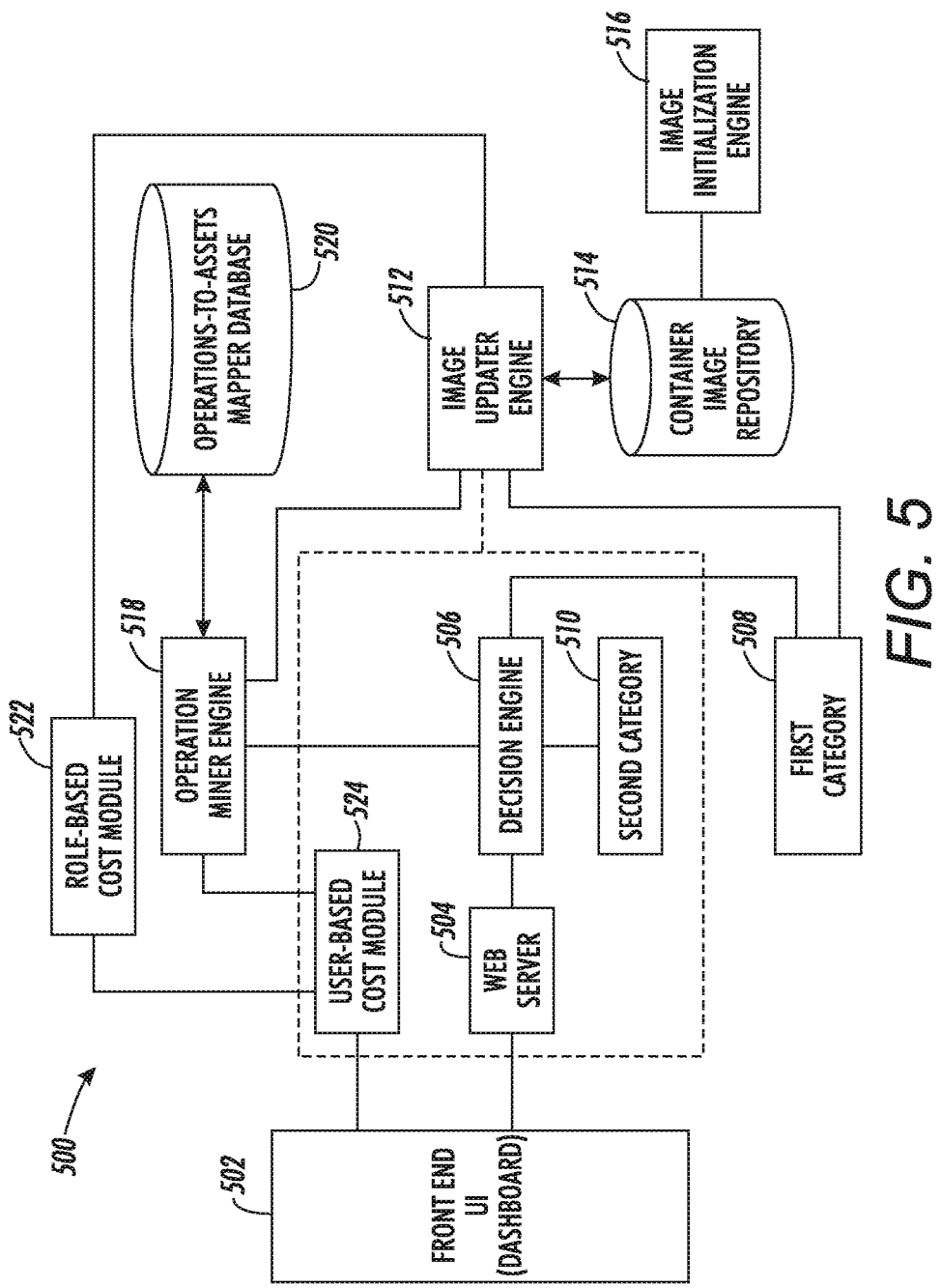
FIG. 5 is a block diagram that illustrates an exemplary flow of analytics assets management in an organization, in accordance with at least one embodiment.

FIG. 5 is a block diagram that illustrates an exemplary system architecture for analytics assets management in an organization, in accordance with at least one embodiment. With reference to FIG. 5, there is shown an exemplary system architecture 500 that is described in conjunction with FIG. 1, FIG. 2, and FIG. 3. The exemplary system architecture 500 includes a front end user interface 502, a web server 504, a decision engine 506, a first category 508, a second category 510, an image updater engine 512, a container image repository 514, an image initialization engine 516, an operation miner engine 518, an operations-to-assets mapper database 520, a role-based cost module 522, and a user-based cost module 524. The web server 504, the decision engine 506, the second category 510, and the user-based cost module 524 forms the OS container instance of a user.

In an embodiment, the front end user interface 502 may be utilized by the user to transmit a request to the web server 504 for one or more analytics assets that are required to process a task. The web server 504 may be configured to receive the request for the one or more analytics assets from the front end user interface 502. The web server 504 may further forward the received request to the decision engine 506. The decision engine 506 may comprise suitable logic, circuitries, interfaces, and/or codes that may be configured to execute one or more set of instructions, programs, or algorithms stored in the memory 204 to perform one or more associated operations. After receiving the request, the decision engine 506 may be configured to search for the one or more analytics assets, on the user-computing device 102, that are required to process the task. The decision engine 506 may be configured to perform a check to determine if the one or more required analytics assets correspond to the second category 510. In case the one or more required analytics assets correspond to the second category 510, the decision engine 506 may deliver the one or more required analytics assets to the user through the front end user interface 502. However, if the one or more required analytics assets do not correspond to the second category 510, the decision engine 506 may transmit a query to the first category 508 to extract the one or more required analytics assets. Further, in an embodiment, output of the decision engine 506 is transmitted to the operation miner engine 518.

The operation miner engine 518 logs the received request to a local storage unit, such as the operations-to-assets mapper database 520. Based on the output from the decision engine 506, the operation miner engine 518 may be operable to determine if the one or more required analytics assets are needed to be transmitted from the first category 508 to the second category 510. If the one or more required analytics assets are needed to be transmitted from the first category 508 to the second category 510, the operation miner engine 518 may transmit a name of the OS container instance and the one or more required analytics assets to the image updater engine 512. Further, in an embodiment, the image updater engine 512 may extract the OS container instance of the user from the container image repository 514. The image updater engine 512 may further extract the one or more required analytics assets from the first category 508. Based on the extracted OS container instance of the user and one or more required analytics assets, the image updater engine 512 may be configured to generate a new OS container instance of the user.

The image initialization engine 516 may be operable to generate the OS container image of the user by using the static code analysis technique. The OS container image of the user includes the OS container instance that comprises the second category 510, i.e., a local pool of analytics assets that are used by the user based on the role.

Further, in an embodiment, at a periodic time interval, the operation miner engine 518 may be operable to determine information that is representative of historical usage of the one or more analytics assets by one or more users associated with a role in an organization. The one or more analytics assets correspond to each of the first category 508 and the second category 510. The operation miner engine 518 may determine the information based on at least monitoring of the OS container instance of each of the one or more users associated with the same role in the organization. Thereafter, if the operation miner engine 518 determines that an update of the OS container instance of the user is required based on the determined information, the operation miner engine 518 may be operable to transmit the determined information to the image updater engine 512.

Based on the received information, the image updater engine 512 may remove the one or more analytics assets from the second category 510 that are unutilized, i.e., a utilization of the one or more analytics assets that correspond to the second category 510 is below a threshold value during a predefined time duration. Further, the image updater engine 512 may add the one or more analytics assets to the second category 510 from the first category 508 based on the usage of the one or more analytics assets in the first category 508 by one or more other users associated with the same role in the organization. Based on addition (or removal) of the one or more analytics assets to (or from) the second category, the image updater engine 512 may be configured to update the generated new OS container instance of the user. Thereafter, the image updater engine 512 may provide the updated new OS container instance to the user. The updated new OS container instance includes at least the one or more required analytics assets.

Further, in an embodiment, the user-based cost module 524 may be operable to determine a user-based cost of using the one or more analytics assets by the user. The user-based cost module 524 may determine the cost based on a type of the one or more analytics assets that are being used by the user and a corresponding frequency of usage. Further, in an embodiment, the role-based cost module 522 may be operable to determine a role-based cost of the one or more analytics assets associated with the role in the organization based on at least an aggregation of the user-based cost, a type of the OS container image, a count of OS container instances created, a count of updates of the OS container image, a count of the one or more analytics assets being used, and/or the like. Further, the cost incurred by the organization for the one or more analytics assets is optimized based on at least a classification of the one or more analytics assets into one or more topologies of operating modes. The classification of the one or more analytics assets into the one or more topologies is based on at least a cost plan associated with the one or more analytics assets. The cost plan of an analytics asset is determined based on one of a price factor, a storage requirement, a runtime performance, a usage factor, and a scalability factor of the one or more analytics assets. For example, a cost plan may correspond to a basic cost plan, an advanced cost plan, and a premium cost plan.

In an embodiment, the basic cost plan may include one or more basic analytics assets that are free or available from an open source. Such type of one or more basic analytics assets are stored or installed inside the second category 510 of the OS container instance of the user. In an embodiment, the advanced cost plan may include one or more advanced analytics assets that may provide specialized functionalities to the user. Such type of one or more advanced analytics assets are stored or installed inside the first category 508 of the OS container instance of the user. Further, the user may have to make remote invocations in order to use the one or more advanced analytics assets. In an embodiment, the premium cost plan may include the one or more premium analytics assets that may provide specialized functionalities to the user. However, these one or more premium analytics assets are installed within the users' local assets, i.e., the second category 510. This may help users circumvent issues relating to throughput performance, response times, etc., that may be prevalent in the advanced plan owing to shared global assets.

In an embodiment, an operating mode may correspond to one of a basic operating mode, an advanced operating mode, and a premium operating mode. For example, when an application to process a task utilizes the one or more analytics assets that are stored or installed locally (in its OS container instance), i.e., the second category 510 and that are classified into the basic cost plan, then the mode of operation is referred to as the basic operating mode. When the application to process the task utilizes the one or more analytics assets that are stored or installed in a global or shared OS container, i.e., the first category 508 and that are classified into the advanced cost plan, the mode of operation is referred to as the advanced operating mode. Further, when the application to process the task utilizes the one or more analytics assets classified into the advanced cost plan and invokes them from the first category 508 for more than "N" invocations, then the processor 202 may install the one or more analytics assets locally (i.e., inside the second category 510) for all further invocations. While doing so, the processor 202 may also modify the operation mode automatically and seamlessly to the premium cost plan. Such combination of pre-defined cost plans may be referred to as a topology of operating modes. Various topologies of operating modes have been explained in detail in FIGS. 6A, 6B, and 6C.

Figure 6A:
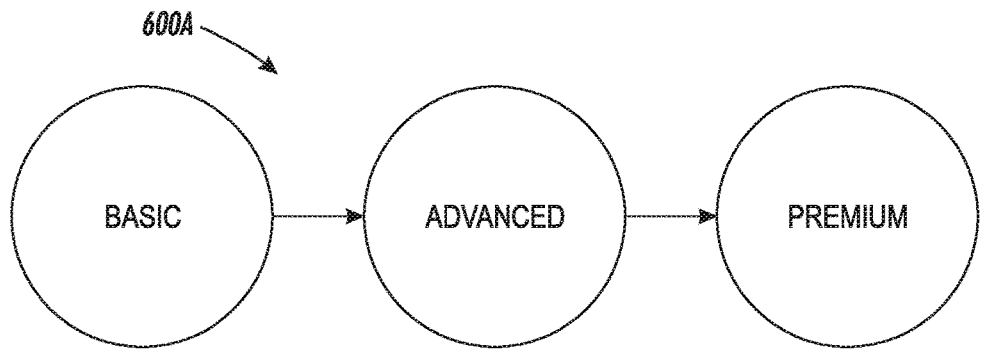
FIG. 6A is an exemplary first topology of operating modes, in accordance with at least one embodiment.

FIG. 6A is an exemplary first topology of operating modes, in accordance with at least one embodiment. The first topology mode may be based on one or more pre-defined cost plans. The cost plans may be classified into a basic cost plan, indicated as "Basic Plan," an advanced cost plan, indicated as "Advanced Plan," and a premium cost plan, indicated as "Premium Plan." With reference to FIG. 6A, initially, the cost plan may be Basic Plan. In the Basic Plan, the user may require only basic pre-determined one or more free software, installed locally, for executing one or more applications. Based on pre-defined one or more pseudo codes, when an application uses software packages installed in a global or shared container, the cost plan may shift to the Advanced Plan. Lastly, if the user requires one or more specialized packages for one or more applications, then the cost plan may shift to the Premium Plan.

Figure 6B:
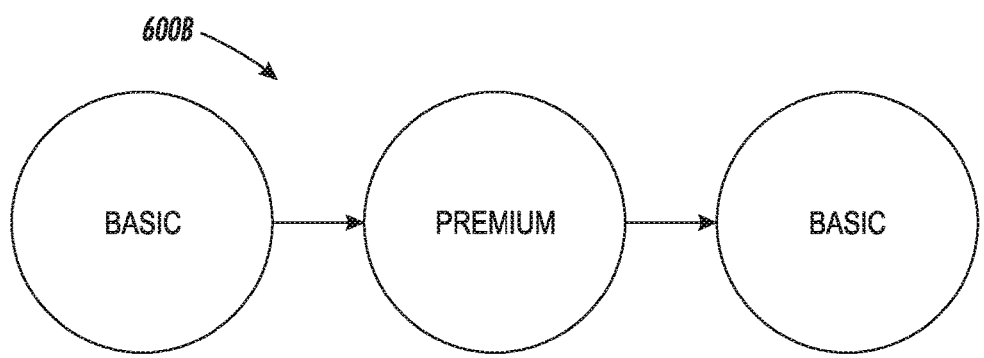
FIG. 6B is an exemplary second topology of operating modes, in accordance with at least one embodiment.

FIG. 6B is an exemplary second topology of operating modes, in accordance with at least one embodiment. The second topology mode may be based on one or more pre-defined cost plans. As explained in FIG. 6A, the cost plans may be classified into "Basic Plan," "Advanced Plan," and "Premium Plan." With reference to FIG. 6B, initially, the cost plan may be Basic Plan. In the Basic Plan, the user may require only basic pre-determined one or more free software, installed locally, for executing one or more applications. Subsequently, for certain one or more tasks in a pre-defined time interval, the user may require one or more specialized packages for one or more applications. Thus, the user may shift to the Premium Plan. Lastly, upon completion of the task by the one or more specialized packages, the cost plan may shift again to the Basic Plan.

Figure 6C:
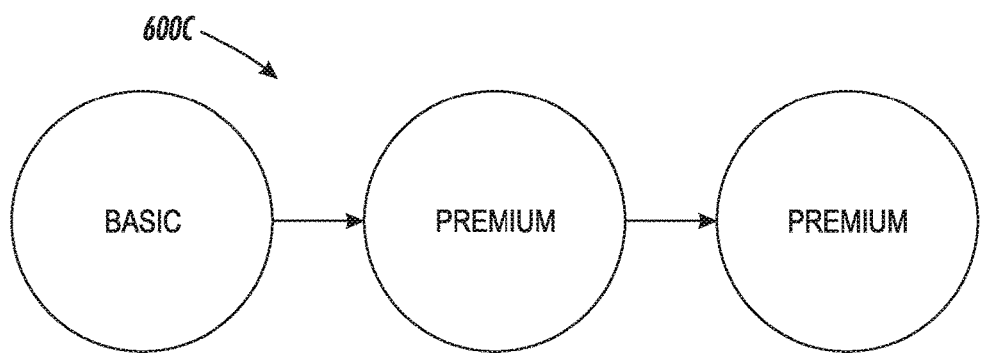
FIG. 6C is an exemplary third topology of operating modes, in accordance with at least one embodiment.

FIG. 6C is an exemplary third topology of operating modes, in accordance with at least one embodiment. The third topology mode may be based on one or more pre-defined cost plans. As explained in FIG. 6A, the cost plans may be classified into "Basic Plan," "Advanced Plan," and "Premium Plan." With reference to FIG. 6C, initially, the cost plan may be Basic Plan. In the Basic Plan, the user may require only basic pre-determined one or more free software, installed locally, for executing one or more applications. Subsequently, for certain one or more tasks in a pre-defined time interval, the user may require one or more specialized packages for one or more applications. Thus, the user may shift to the Premium Plan and may remain in the Premium Plan.

Various embodiments of the disclosure encompass numerous advantages including method and system for managing analytics assets in an organization. In an embodiment, the method and system may utilize OS containers for managing analytics assets in an organization. In an embodiment, the method and the system may be utilized for optimizing the cost associated with the analytics assets in an organization and also maintain an isolation between different application deliveries to different users.

The disclosed methods and systems, as illustrated in the ongoing description or any of its components, may be embodied in the form of a computer system. Typical examples of a computer system include a general-purpose computer, a programmed microprocessor, a micro-controller, a peripheral integrated circuit element, and other devices, or arrangements of devices that are capable of implementing the steps that constitute the method of the disclosure.

The computer system comprises a computer, an input device, a display unit and the Internet. The computer further comprises a microprocessor. The microprocessor is connected to a communication bus. The computer also includes a memory. The memory may be Random Access Memory (RAM) or Read Only Memory (ROM). The computer system further comprises a storage device, which may be a hard-disk drive or a removable storage drive, such as, a floppy-disk drive, optical-disk drive, and the like. The storage device may also be a means for loading computer programs or other instructions into the computer system. The computer system also includes a communication unit. The communication unit allows the computer to connect to other databases and the Internet through an input/output (I/O) interface, allowing the transfer as well as reception of data from other sources. The communication unit may include a modem, an Ethernet card, or other similar devices, which enable the computer system to connect to databases and networks, such as, LAN, MAN, WAN, and the Internet. The computer system facilitates input from a user through input devices accessible to the system through an I/O interface.

In order to process input data, the computer system executes a set of instructions that are stored in one or more storage elements. The storage elements may also hold data or other information, as desired. The storage element may be in the form of an information source or a physical memory element present in the processing machine.

The programmable or computer-readable instructions may include various commands that instruct the processing machine to perform specific tasks, such as steps that constitute the method of the disclosure. The systems and methods described can also be implemented using only software programming or using only hardware or by a varying combination of the two techniques. The disclosure is independent of the programming language and the operating system used in the computers. The instructions for the disclosure can be written in all programming languages including, but not limited to, "C," "C++," "Visual C++," Java, and "Visual Basic." Further, the software may be in the form of a collection of separate programs, a program module containing a larger program or a portion of a program module, as discussed in the ongoing description. The software may also include modular programming in the form of object-oriented programming. The processing of input data by the processing machine may be in response to user commands, the results of previous processing, or from a request made by another processing machine. The disclosure can also be implemented in various operating systems and platforms including, but not limited to, "Unix," "DOS," "Android," "Symbian," and "Linux."

The programmable instructions can be stored and transmitted on a computer-readable medium. The disclosure can also be embodied in a computer program product comprising a computer-readable medium, or with any product capable of implementing the above methods and systems, or the numerous possible variations thereof.

Various embodiments of the methods and systems for managing delivery of analytics assets to a user of an organization using OS containers have been disclosed. However, it should be apparent to those skilled in the art that modifications in addition to those described, are possible without departing from the inventive concepts herein. The embodiments, therefore, are not restrictive, except in the spirit of the disclosure. Moreover, in interpreting the disclosure, all terms should be understood in the broadest possible manner consistent with the context. In particular, the terms "comprises" and "comprising" should be interpreted as referring to elements, components, or steps, in a non-exclusive manner, indicating that the referenced elements, components, or steps may be present, or utilized, or combined with other elements, components, or steps that are not expressly referenced.

A person having ordinary skills in the art will appreciate that the system, modules, and sub-modules have been illustrated and explained to serve as examples and should not be considered limiting in any manner. It will be further appreciated that the variants of the above disclosed system elements, or modules and other features and functions, or alternatives thereof, may be combined to create other different systems or applications.

Those skilled in the art will appreciate that any of the aforementioned steps and/or system modules may be suitably replaced, reordered, or removed, and additional steps and/or system modules may be inserted, depending on the needs of a particular application. In addition, the systems of the aforementioned embodiments may be implemented using a wide variety of suitable processes and system modules and is not limited to any particular computer hardware, software, middleware, firmware, microcode, or the like.

The claims can encompass embodiments for hardware, software, or a combination thereof.

It will be appreciated that variants of the above disclosed, and other features and functions or alternatives thereof, may be combined into many other different systems or applications. Presently unforeseen or unanticipated alternatives, modifications, variations, or improvements therein may be subsequently made by those skilled in the art, which are also intended to be encompassed by the following claims.

What is claimed is:

1. A method to manage analytics assets associated with at least one computer accessible to an organization, the method comprising:
   receiving, by one or more transceivers, a request from a user computing device associated with a user, wherein the received request corresponds to processing of a task on the user computing device;
   selecting, by one or more processors, a set of analytics assets from a first category based on the received request, the set of analytics assets from the first category stored on a common shared storage unit;
   extracting one or more analytics assets of the set of analytics assets from the first category from a database server;
   categorizing the extracted one or more analytics assets into a second category corresponding to the user, the categorizing based on a role of the user in the organization wherein the one or more analytics assets that correspond to the second category are included in an operating system (OS) container image associated with the user;
   updating, by the one or more processors, the OS container image associated with the user based on the second category and a historical usage of the one or more analytics assets by the user, wherein the updating the OS container image associated with the user comprises adding a layer to the OS container, the layer corresponding to an analytics asset of the extracted one or more analytics assets from the first category; and
   outputting, by one or more graphical processors, the extracted one or more analytics assets through the updated OS container image for operation on the user computing device of the user.

2. The method of claim 1, wherein the one or more analytics assets correspond to at least one of one or more statistical packages, one or more applications and related tools, one or more process mining tools, and one or more open-source or licensed data mining packages.

3. The method of claim 2, wherein the one or more analytics assets are categorized in the first category and the second category by use of a static code analysis technique.

4. The method of claim 3, wherein the first category comprises the one more analytics assets that are shared with one or more other users associated with one or more roles in the organization.

5. The method of claim 3, wherein the second category comprises the one or more analytics assets that are shared with the user associated with the role in the organization.

6. The method of claim 3 further comprising updating, by the one or more processors, the second category based on a usage of the one or more analytics assets that correspond to the first category.

7. The method of claim 3 further comprising updating, by the one or more processors, the OS container image based on a usage of the one or more analytics assets that correspond to the second category, wherein the second category is updated by removing the one or more analytics assets when a utilization of the one or more analytics assets is below a threshold value during a predefined time duration.

8. The method of claim 1 further comprising optimizing, by the one or more processors, a cost incurred by the organization for the one or more analytics assets based on at least a classification of the one or more analytics assets into one or more operating modes.

9. The method of claim 8, wherein the classification of the one or more analytics assets into one or more topologies of the one or more operating modes is based on at least one of a price factor, a storage requirement, a runtime performance, an usage factor and a scalability factor of the one or more analytics assets.

10. A system to manage analytics assets associated with at least one computer accessible to an organization, the system comprising:
  one or more transceivers configured to:
    receive a request from a user computing device associated with a user, wherein the received request corresponds to processing of a task on the user computing device;
  one or more processors configured to:
    select a set of analytics assets from a first category based on the received request, the set of analytics assets from the first category stored on a common shared storage unit;
    extract one or more analytics assets of the set of analytics assets from the first category from a database server;
    categorize the extracted one or more analytics assets into a second category corresponding to the user, the categorizing based on a role of the user in the organization wherein the one or more analytics assets that correspond to the second category are included in an operating system (OS) container image associated with the user;
    update the OS container image associated with the user based on the second category and a historical usage of the one or more analytics assets by the user, wherein the update of the OS container image associated with the user comprises adding a layer to the OS container, the layer corresponding to an analytics asset of the extracted one or more analytics assets from the first category; and
  one or more graphical processors configured to:
    output the extracted one or more analytics assets through the updated OS container image for operation on the user computing device of the user.

11. The system of claim 10, wherein the one or more analytics assets correspond to at least one of one or more statistical packages, one or more applications and related tools, one or more process mining tools, and one or more open-source or licensed data mining packages.

12. The system of claim 11, wherein the one or more processors are configured to categorize the one or more analytics assets into the first category and the second category by use of a static code analysis technique.

13. The system of claim 12, wherein the first category comprises the one more analytics assets that are shared with one or more other users associated with one or more roles in the organization.

14. The system of claim 12, wherein the second category comprises the one or more analytics assets that are shared with the user associated with the role in the organization.

15. The system of claim 12, wherein the one or more processors are further configured to update the second category based on a usage of the one or more analytics assets that correspond to the first category.

16. The system of claim 12, wherein the one or more processors are further configured to update the OS container image based on a usage of the one or more analytics assets that correspond to the second category, wherein the second category is updated when a utilization of the one or more analytics assets is below a threshold value during a predefined time duration.

17. The system of claim 10, wherein the one or more processors are further configured to optimize a cost incurred by the organization for the one or more analytics assets based on at least a classification of the one or more analytics assets into one or more operating modes.

18. The system of claim 17, wherein the classification of the one or more analytics assets into one or more topologies of the one or more operating modes is based on at least one of a price factor, a storage requirement, a runtime performance, an usage factor and a scalability factor of the one or more analytics assets.

19. A computer program product for use with a computer, the computer program product comprising a non-transitory computer readable medium, wherein the non-transitory computer readable medium stores a computer program code to manage analytics assets associated with at least one computer accessible to an organization, wherein the computer program code is executable by one or more processors to:
  receive a request from a user computing device associated with a user, wherein the received request corresponds to processing of a task on the user computing device;
  one or more processors configured to:
  select a set of analytics assets from a first category based on the received request, the set of analytics assets from the first category stored on a common shared storage unit;
  extract one or more analytics assets of the set of analytics assets from the first category from a database server;
  categorize the extracted one or more analytics assets into a second category corresponding to the user, the categorizing based on a role of the user in the organization wherein the one or more analytics assets that correspond to the second category are included in an operating system (OS) container image associated with the user;
  update the OS container image associated with the user based on the second category and a historical usage of the one or more analytics assets by the user, wherein the update of the OS container image associated with the user comprises adding a layer to the OS container, the layer corresponding to an analytics asset of the extracted one or more analytics assets from the first category; and
  output the extracted one or more analytics assets through the updated OS container image for operation on the user computing device of the user.

* * * * *